United States Patent [19]

Schroeder et al.

[11] 4,160,041
[45] Jul. 3, 1979

[54] METHOD OF PREPARING A SOLID ANIMAL FEED SUPPLEMENT

[75] Inventors: Jack J. Schroeder, Rollings Hills; James W. Sawhill, Canoga Park, both of Calif.

[73] Assignee: Jack J. Schroeder, Long Beach, Calif.

[21] Appl. No.: 768,324

[22] Filed: Feb. 14, 1977

[51] Int. Cl.² .............................................. A23K 1/22
[52] U.S. Cl. .................................... 426/69; 426/334; 426/583; 426/658; 426/807; 426/648
[58] Field of Search ................... 426/2, 69, 335, 532, 426/583, 601, 630, 635, 636, 643, 644, 647, 658, 807, 334, 648

[56] References Cited

U.S. PATENT DOCUMENTS

| | | | |
|---|---|---|---|
| 3,020,158 | 2/1962 | Fetzer | 426/69 |
| 3,212,933 | 10/1965 | Hess et al. | 426/807 X |
| 3,420,672 | 1/1969 | Appleman | 426/69 X |
| 3,988,483 | 10/1976 | Deyoe et al. | 426/583 X |
| 4,016,296 | 4/1977 | DeSantis | 426/630 X |
| 4,027,043 | 5/1977 | Schroeder | 426/69 |

*Primary Examiner*—Joseph M. Golian
*Assistant Examiner*—R. A. Yoncoskie
*Attorney, Agent, or Firm*—Fulwider, Patton, Reiber, Lee & Utecht

[57] ABSTRACT

There is disclosed a method for the manufacture of a solid animal feed supplement employing an in-situ reaction between a hydratable metal oxide such as calcium oxide and a water soluble phosphate, such as phosphoric acid to solidify the product. The method comprises the addition of the metal oxide to a concentrated dispersion of a water soluble sugar such as molasses, whey and the like, to hydrate the metal oxide. After sufficient hydration has occurred to provide the desired quantity of reactant metal ions in soluble form, a condition which can be detected by monitoring the pH, temperature, or time following addition of the metal oxide, the soluble phosphate is added to cause solidification of the resultant mixture.

18 Claims, No Drawings

METHOD OF PREPARING A SOLID ANIMAL FEED SUPPLEMENT

BACKGROUND OF THE INVENTION

1. Field of the Invention

This invention relates to an animal feed supplement and, in particular, to an animal feed supplement in solid form.

2. Brief Description of the Prior Art

The value of carbohydrate-containing supplements as an energy source in animal diets has been recognized for many years. Phosphoric acid has often been added to supplements to serve as a preservative and as a source of dietary phosphorous, and urea has been added to ruminant feed supplements to supply nonprotein nitrogen. Fats have been included in these supplements as described in U.S. Pat. No. 2,793,952, and vitamins have also been used as described in U.S. Pat. No. 2,807,546. Most of the aforementioned animal feed supplements have been employed as a liquid which must be mixed with the animals' feed rather than permitting free choice feeding.

Attempts have been made to prepare these supplemental feeds as solids. Typical of these are salt blocks, mineral blocks, protein blocks and molasses blocks. The feed blocks offer the advantage of free choice feeding of animals, thereby reducing the labor and expense otherwise incurred to mix the feed supplement with the animals' feed ration. These blocks have, heretofore, been manufactured by compressing ingredients into a molded shape or by evaporative heating of the ingredients. Both methods have disadvantages; the compressed blocks have limited contents of energy-supplying ingredients such as molasses and fat, and heat-sensitive vitamins and the like may be partially oxidized and/or decomposed by evaporative heating.

U.S. Pat. No. 3,420,672, discloses the formation of stable emulsions of edible fats in a molasses-containing feed supplement with a starch emulsifying agent. The patent also discloses that the use of relatively large amounts of starch, e.g., around 6 percent, solidifies the compositions. It is desirable to reduce the quantity of starch necessary for solidification of the fat-containing molasses feed supplement and to impart a substantial water resistance to the compositions. Additionally, it is desirable to provide the proper proportions of edible fat and a sugar source such as molasses for the energy requirements of the animals while maintaining sufficient palatability to permit the free choice feeding by animals. When the composition is intended for use with ruminants, the composition can also contain the necessary quantity of nonprotein nitrogen in the form of urea to supply the ruminants' dietary protein requirements.

A recent development has been the discovery that the addition of a soluble phosphate to the feed supplement together with a soluble source of calcium, such as calcium chloride, sulfate or oxide, results in an in-situ reaction which can solidify the feed supplement into a solid block form.

Although calcium oxide is a preferred material for this purpose, it does not permit as facile a reaction as can be achieved with more soluble sources of calcium. Additionally, it was discovered that optimum hardness of the resultant product can be achieved with calcium oxide only when supplemental amounts of a starch additive are employed, the latter undesirably increasing the cost of manufacture of the product.

BRIEF STATEMENT OF THE INVENTION

This invention comprises a method for the facile preparation of a solid animal feed supplement utilizing an in-situ reaction between a soluble phosphate and an alkaline earth metal oxide such as calcium oxide. The animal feed supplement typically is prepared from a concentrated dispersion of a sugar source such as molasses, whey, and the like. The method of this invention comprises the initial addition of the alkaline earth metal oxide to the concentrated aqueous dispersion, hydration of the metal oxide in the resultant mixture until a sufficient quantity of soluble metal ions are present and, thereafter, addition of a soluble phosphate such as phosphoric acid to the hydrated mixture, whereupon in-situ reaction occurs to form a floculant precipitate which can solidify the supplement. The metal oxide ingredients which can be employed are aluminum, calcium or magnesium oxides. Of these, calcium oxide is the preferred.

Preferably, the composition also contains an edible fat or oil and a fat emulsifying agent can be added to prevent separation of the fat or oil from the solid composition. A protein ingredient can also be added, however, when the composition is intended for consumption by ruminants, a nonprotein nitrogen ingredient such as urea can be added in a sufficient quantity to supply the ruminants' dietary protein requirements.

DESCRIPTION OF PREFERRED EMBODIMENTS

The method of this invention provides an improved manufacture of solid feed supplements using a metal oxide and a soluble phosphate to solidify liquid feed ingredients. The chief ingredient of the supplement is a sugar source which is used as an aqueous concentrate. The metal oxide is added to the aqueous sugar source and permitted to hydrate for a predetermined interval whereupon the soluble phosphate is added to initiate the solidification reaction. Shortly thereafter, usually within ½ to several hours, the admixture of these ingredients forms a water-resistant solid. A variety of other nutrients can be incorporated in the supplement by their addition to either or both the sugar and phosphate ingredients or to the reacting admixture prior to its solidification. Furthermore, the reacting admixture can be admixed with solid feed ingredients in amounts up to about equal weight proportions and still prepare a consolidated solid product.

The following table sets forth the proportions of the ingredients in the composition of the invention:

TABLE 1

| COMPONENT | BROAD | | | PREFERRED | | |
|---|---|---|---|---|---|---|
| 1. Sugar source | 15 | – | 93% | 25 | – | 80% |
| 2. Phosphate source (as $P_2O_5$) | 0.1 | – | 30% | 5 | – | 20% |
| 3. Metal Oxide | 0.5 | – | 5% | 0.8 | – | 3% |
| 4. Fat source | 0.0 | – | 30% | 5 | – | 20% |
| 5. Emulsifier | 0.05 | – | 1.0% | | | |
| 6. Starch | 0.0 | – | 0.0 | 0.0 | – | 1.0% |
| 7. Protein or Equivalent Protein | 0.0 | – | 40.0% | 5.0 | – | 40% |
| 8. Minerals, vitamins | 0.0 | – | 1.0% | 0.1 | – | 0.5% |
| 9. Preservatives | 0.05 | – | 8.0% | 0.1 | – | 5.0% |

Sugar Ingredient

The feed supplement prepared by this invention contains a sugar as its chief ingredient. The source of sugar can be added at a concentration of from 15 to about 93, preferably from 25 to about 80 weight percent based on the weight of the sugar-containing source, to the feed supplement. The sugar ingredient can be any commercially available sugar such as sucrose, glucose, lactose, maltose or fructose. The source of surcrose is the cane and beet sugar industry; of glucose, the corn starch industry; and of lactose, the dairy industry. Maltose is available in malt syrup and fructose is available as a by-product of the dextran industry or from invert sugar. Preferably, aqueous solutions containing from 10 to about 90 weight percent, preferably from 12 to about 60 weight percent, sugars, are used. This concentration range includes most commercially available sugar-containing by-products of various industries.

The sugar industry produces large quantities of molasses which can be used directly. Molasses is commercially available as an aqueous solution having a sugar content from about 60 to 85 Brix, and a consistency varying from a thin to a thick syrup. The molasses can be any sugarcontaining molasses such as cane or backstrap molasses, beet molasses, converted molasses, wood sugar molasses, hydrosyrup, citrus molasses and the like. Molasses of a concentration of from 65 to about 85 Brix is preferred. By-products of the molasses and sugar industry can also be used such as Steffens filtrate, a sugar containing byproduct obtained from beet molasses. Another sugar industry by-product in Myces, which is the residue after separation of yeast cells grown in a molasses culture medium.

Another by-product useful herein as a sugar ingredient is starch molasses which is a by-product of dextrose manufacture from corn or grain sorghums by acid or enzymatic hydrolysis. It contains greater than about 40 weight percent reducing, and greater than about 50 weight percent total, sugars (calculated as dextrose).

Another sugar source is the dairy industry which produces large quantities of whey as a by-product of cheese manufacture. The whey is a dilute solution of the lactoalbumin, lactose, some of the fat, and the soluble inorganics from the parent milk. This solution is condensed and then spray dried or condensed to 40 or 50% solids and preserved. A typical analysis is as follows:

TABLE 2

| Composition of a Typical Spray Dried Whey | |
|---|---|
| Protein | 12.0% |
| Fat | 0.7% |
| Lactose | 60.0% |
| Phosphorous | 0.79% |
| Calcium | 0.87% |
| Ash | 9.7% |

Modified wheys such as partially delactosed whey in which some of the lactose in the whey is selectively removed can also be used. Another modified whey is partially hydrolyzed whey in which some of the lactose is hydrolyzed (usually by lactate enzymatic hydrolysis) thereby reducing the lactose content. A reduction in the lactose content of the whey is desirable to permit use of higher solids content wheys than can be used with the unmodified whey. The typical spray dried or condensed whey is limited to a solids content of from 40 to about 60 weight percent since lactose crystalizes at ambient temperatures from wheys of higher content lactose.

The aforementioned modified wheys are free of this crystalization tendency and their solids content can be from 40 to about 80 weight percent without encountering any instability. Other milk products which can be included as a sugar source include dry skimmed milk which is the residue obtained by drying of defatted milk, and condensed skim milk residue, obtained by evaporating defatted milk.

A third source of sugar is the pulp and paper industry which produces large quantities of by-product wood sugars such as lignin sulfonates from wood during the sulfite pulping process. After the separation of lignin, the acidity of the resultant solution is neutralized with an ammonium or alkali metal bisulfite compound or base to form the following organic salts:

ammonium lignin sulfonate;
sodium lignin sulfonate; and
magnesium lignin sulfonate.

A typical analaysis of a commercially available ammonium lignin sulfonate solution is as follows:

TABLE 3

| Typical Analysis of Ammonium Lignin Sulfonate | |
|---|---|
| Percent Solids | 50.0% |
| Specific gravity | 1.237 |
| pH, 10% solution | 3.5 |
| Wood Sugars - (Expressed as glucose) | 16.0% |
| Tannin content | 45.0% |
| Available ammonia | 3.0% |
| Sulfur | 6.0% |
| Ash | 1.0% |

The manufacture of pressed wood yields another sugar-containing by-product which is hemicellulose extract, a concentrated, soluble material obtained from treatment of wood at elevated temperature and pressure. This by-product has a total carbohydrate content greater than about 55 weight percent and contains pentose and hexose sugars. This by-product can be used as a sugar ingredient in the preparation of this invention.

The corn industry yields a number of by-products which contain sugars, typically glucose, and proteins. Example of these are corn glutin feed, hydrolyzed corn protein and condensed fermented corn extractives. These also can be used as a sugar and/or protein ingredient herein.

The Phosphate Ingredient

The phosphate which is employed as a solidifying component in the feed supplement can be any suitable feedgrade phosphate having an acidic pH value or phosphoric acid. Useful acids include electric furnace (white) phosphoric acid, or deflorinated, wet-process (green) phosphoric acid, which can be of any commercially available grade such as the commonly available concentration range of from 50 to about 55 weight percent, expressed as $P_2O_5$, corresponding to a concentration of orthophosphoric acid of about 70 weight percent. More concentrated acids can be employed if desired such as the anhydrous polyphosphoric acids which contain, in addition to orthophosphoric acid, higher polymers thereof including pyro and tripolyphosphoric acids. Examples of acidic pH value phosphates which can be used are: mono-ammonium or mono-alkali metal phosphates, such as mono-ammonium, mono-sodium, mono-potassium orthophosphates, etc. Phosphorous anhydride ($P_2O_5$) can also be employed since it forms phorphoric acid upon addition to water or an aqueous solution.

The preparation of the feed supplement can comprise maintaining an aqueous suspension at temperatures, e.g., from 40° to about 140° F., preferably about 60° to 120° F., and the phosphate polymers may hydrolyze to the ortho form during preparation of the supplement. Accordingly, orthophosphates or ortho-phosphoric acid are the preferred phosphate sources. The phosphate source is employed in the feed supplement at a concentration from about 0.5 to about 5, preferably from 2.5 to about 4, weight percent expressed as $P_2O_5$.

The Metal Oxide Ingredient

The other solidifying component of the composition is an oxide of a metal such as aluminum, calcium or magnesium. Typical reactants include calcium oxide, magnesium oxide, aluminum oxide, of which calcium oxide is preferred. Soluble salts of the metals can, if desired, be included in the preparation such as the chloride, sulfate, acetate, propionate, etc. The amounts of the metal salts are preferably limited because of their greater costs. Accordingly, if metal salts are included, the proportion of metal equivalents from the oxide should be at least about 1.5 and, preferably at least twice the equivalents from any salt coadditive.

The amount of the metal ingredient which is employed can be from 0.5 to about 5 weight percent, expressed as the oxide, and preferably is from about 0.8 to about 4.0 weight percent, based on the weight of the feed supplement. It is believed that the soluble phosphate and added metal source, e.g., calcium oxide, function by at least partial reaction to form an insoluble metal phosphate and that this reaction is best performed with metal ions obtained by the hydration of the added metal oxide. The exact nature and extent of the reaction is not presently known and these ingredients are, therefore, described herein as additives, recognizing that during the preparation of the product there may be a reaction product formed by a partial neutralization of the phosphoric acid or by a metathesis reaction between soluble phosphates and metal additives.

The Fat Ingredient

The fats and oils that can be employed in the invention as a source of animal edible fat are the edible, water insoluble fats and oils from animal and vegetable sources which can be liquids or solids at room temperature. The compositions can contain from 2 to about 30, preferably from 5 to about 20 weight percent edible fat. These fats are various fatty acids such as stearic, palmitic, oleic, linoleic, lauric, etc., and the mono-, di- or triglycerides of these fatty acids. Useful fats and oils can also include complex lipids such as the phospholipids, e.g., fatty acid esters of glycerol phosphate or lecithins, which also contain nitrogen bases such as choline. The fats are commonly identified by source and suitable fats which can be employed include the oils, tailings or residues of the following: soybean oil, cottonseed oil, sesame oil, olive oil, corn oil, tallow, fish oil, coconut oil, palm oil, etc. Preferably, relatively inexpensive sources of fats are employed such as the yellow grease compositions which are reclaimed restaurant fats and greases, acidulated soap stocks or acidulated fats and oils. The fat ingredient can also contain an antioxidant in an effective amount to inhibit oxidative degradation of the fat, e.g., from 0.01 to about 1 weight percent butylated hydroxyanisole, butylated hydroxytoluene, 4-hydromethyl-2, 6-di-tert bulytphenol, etc.

The Fat Emulsifier

The composition can also contain a fat emulsifying agent and for this purpose any suitable cationic, anionic or nonionic surfactant can be employed. Examples of cationic surfactants include fatty amines, fatty amides, quaternary alkyl and aryl ammonium salts and hydrates, etc. Suitable anionic surfactants include the fatty acid gyceride sulfonates and fatty acid sulfonates such as sulfonated cottonseed oil, sulfonated sperm oil, sulfonated tallow, sulfonated aromatic hydrocarbons, e.g., benzene sulfonic acid, etc. Useful nonionic compounds include polyethylene oxide condensates of hydrophobic groups having a reactive hydrogen with from 10 to about 25 carbons condensed with from 2 to about 15 molecular weights of ethylene oxide. Examples of such materials include polyoxyethylene condensate with alkyl or alkenyl amines or amides, fatty acid partial esters of hexitans, etc. Free fatty acids and phospholipids which are present in some fat sources also function as emulsifying agents and no added emulsifying agent may be required with such fat sources.

The amount of the emulsifying agent employed for stabilizing the composition and preventing the separation of the fat ingredients during the manufacture of the product or weeping of the fat ingredients from the solid block after its formation can be from about 0.05 to about 1 weight percent.

The preferred emulsifying agent employed in the feed supplement is starch. While pure starch is commonly a mixture of form 22–26 weight percent amylose and 74–78 weight percent amylopectin, the starch component can be any starch-containing material including raw starch sources such as ground ceral products, e.g., flour, farina or meals of cereals such as corn, wheat, oats, barley, rice, sorghum, as well as flour of tubers such as potatoes, cassava and arrowroot or sago palm pith. Preferably, the starch component is a commercially available starch product which is refined from the aforementioned raw starch sources by milling, aqueous extraction and drying. The starch component is, most preferably, pregelatinized by partial hydrolysis to increase its water solubility by heating an aqueous suspension of the starch component to form a gel or paste and drying of the product.

The raw starch component, refined starch or hydrolyzates therefrom, such as pregelatinized starch, can be used as the fat emulsifying agent in the preparation of the feed supplement of this invention. When a raw starch or nonhydrolyzed starch component is used, it may be necessary to prolong the heating of the aqueous mixture during preparation of the supplement, or, if desired, by separately heating an aqueous suspension of the starch component to effect gelatinization of the starch.

The starch component can be used, when needed, to enhance the solidification of the composition and to impart a temperature resistant storage stability to the solid product. When the starch component is employed, the amount to be added can be sufficient to provide a concentration of starch, calculated as pure starch from 0.1 to about 6 weight percent, preferably from about 0.1 to about 1.0 weight percent to enhance the solidification of solid feed supplement. With some sugar sources such as condensed wheys, it is preferred to employ moderate levels of starch such as from 0.1 to about 3.0 weight percent, to insure maximum hardness.

Other emulsifying and solidifying components which can be used include the gums, whether artificial or natural. Thus the various cellulose derivatives such as carboxymethylcellulose and alkali metal salts, e.g., sodium salt, hydroxyethylcellulose, hydroxypropyl methylcellulose, etc., the various alignates and their derivatives such as sodium alignate, propylene glycol alignate, etc., can be used. In addition such natural gums such as gum tricgacin, xanthan gum, locust bean gum, etc., may be used. Since starch is less expensive, the aforementioned gums are not the most preferred.

Other solidifying ingredients can be used although the starch, which can be in the form of flour, farina or meals of cerals, potatoes and the like, is preferred. Other materials which can be used include ground alfalfa, or finely ground inert solids such as powdered clays such as bentonite or kaolin, diatomaceous earth, etc.

The Protein Ingredient

The feed supplement can also contain a nitrogen source for the animals' protein requirements. The nitrogen can be in proteins which are commonly found in various sources such as: dried blood or meat meal from rendering plants, cottonseed meal, soy meal, dehydrated alfalfa, dried and sterilized animal and poultry manure, fish meal, liquid or powdered egg, fish solubles, cell cream, and rabbit pellets. The fish solubles is a concentrate of the cooking water from a fish cannery and usually contains about 50 weight percent solids and has a protein content of about 32 weight percent. Cell cream is obtained by drying dead bacterial cells used to manufacture monosodium glutamate by fermentation. The dry powder usually contains about 90 weight percent protein. Rabbit pellets is a commercially available dry, composited mixture of ground, dehydrated alfalfa and a ceral such as a corn or wheat with trace minerals and vitamins.

Protein Equivalent Ingredients

When the feed supplement is intended for consumption by ruminants, a non-protein nitrogen compound such as ammonical compounds, e.g., urea, buiret or mono- or di- ammonium phosphate can be used to supply the protein nitrogen dietary requirements of the animals. The preferred material for a nitrogen source is urea which can be added in an amount from 2 to about 15 weight percent, preferably from about 5 to about 12 weight percent, based on the feed supplement.

Generally, the feed supplement should not contain more than about 40 weight percent equivalent protein content from a protein or nonprotein nitrogen compound and the aforeindicated upper limit for the concentration of urea in the supplement corresponds to this maximum equivalent protein content. When molasses is used as a sugar source, the maximum amount of urea can be reduced by the amount of nitrogen contributed by the molasses (about 1 to 3 weight percent) to the preferred, maximum 12 weight percent limit based on the feed supplement. A typical ruminant feed block would, therefore, contain from 5 to about 15, preferably from 7 to about 12 weight percent urea as a source of nonprotein nitrogen.

Miscellaneous Ingredients

Various trace nutrients, antibiotics and vitamins can also be incorporated in the feed composition, including vitamins A, C and E, tocopherols, as well as antioxidants for these materials such as ethoxyquin (1, 2-dihydro-6-ethoxy-2, 2, 4-trimethyl quinoline). Other additives that can also be included in the composition are promazine hydrochloride, chloromadionone acetate, oxytetracycline, etc. Rumensin can also be added; this is a drug used to control appetite and increase feed efficiency in ruminants. Bloat inhibitors such as poloxaline can also be employed. The quantity and concentration of these materials which can be employed is preferably in accordance with established custom and usage.

Preservatives such as sorbic and benzoic acid and their soluble salts such as the alkali metal salts, e.g., sodium sorbate, potassium sorbate, sodium benzoate, etc., can also be added at conventional concentrations, e.g., from about 0.05 to 1 weight percent, as needed to prevent decomposition of ingredients such as whey products. Other materials, broadly classified as preservatives, include mold inhibitors such as the aliphatic and hydroxyaliphatic acids and monocarboxylic acids having from two to about six carbons, e.g., acetic, propanoic, butyric, valeric, lactice, $\alpha$-hydroxybutyric, valerolactic acids, etc., These additives, when employed at concentrations of from 0.1 to about 8 weight percent, preferably from 2 to about 5 weight percent, inhibit the growth of mold on the surfaces of the solid feed product.

As previously mentioned, the method of the invention comprises the addition of the metal oxide to the concentrated aqueous sugar solution and hydration of the metal oxide before the addition of the soluble phosphate precipitant. The progress of the hydration of the metal oxide can be monitored by a suitable control, e.g., the pH of the admixture can be continuously monitored and the degree of hydration observed by the rising value of the monitored pH. Alternatively, the admixture can be held for a predetermined time interval following the addition of the metal oxide to permit a substantial degree of hydration of the metal oxide.

The metal oxide can be added in amounts in excess of that necessary for the solidification reaction. When excess amounts of the metal oxide are employed, it is preferred that the soluble phosphate be added before complete hydration of the metal oxide occurs, since it has been found that an excess quantity of soluble metal ions, which result from hydration of the metal oxide, prevent the optimum solidification of the final product and result in a soft product having low water resistance.

The metal oxide is generally available as a fine powder or granular solid, typically having particles passing about a 10 mesh screen. The desired quantity of the powdered metal oxide is slowly added to the concentrated sugar solution while stirring to prepare an intimate mixture. In the preferred embodiment, the pH is monitored and is observed to steadily increase until a pH value of between 9 and 11, preferably 9.5 to 10.5 is reached. Thereupon the soluble phosphate such as phosphoric acid, ammonium phosphates, etc. is added in an amount from 0.5 to 5 weight percent, preferably from 2.5 to 4.0 weight percent (reported as the pentoxide). The amount of phosphoric acid employed is preferably sufficient to reduce the pH of the mixture to a value from 3 to about 6, preferably from 3.5 to about 5. Other acids such as acetic, sulfuric, hydrochloric acid, etc., can also be added, as necessary to achieve the desired product pH value.

When fats or oils are to be incorporated in the mixture, it is preferred to admix these ingredients with the concentrated aqueous sugar solution using, as necessary, a sufficient amount of emulsifier to stabilize the dispersion. The remainder of the ingredients used in the feed supplement can be dispersed in the concentrated sugar solution or, if desired, can be added with the phosphate source. Generally, the remainder of the material such as the protein or equivalent protein source, minerals, vitamins, etc., are added to the ingredients as solids. These materials can be stirred or admixed with the liquid ingredients for a sufficient time, e.g., 2 to about 50 minutes, to obtain a thorough dispersion of the material.

In a typical preparation, the solid ingredients are dispersed in the concentrated aqueous sugar solution by addition thereto and the resulting mixture is maintained at a temperature from ambient to about 125° F., preferably from 60° to about 120° F. The fat ingredient and necessary quantity of a fat emulsifier can then be added while agitating the mixture at the aforeindicated temperatures.

The composition will start to thicken within 20 to 30 minutes after the addition of the phosphate source. As the mixture begins to thicken, it can be pumped into containers suitable for shaping of the product into the desirable solid block form. Typically, solid blocks of from 30 to about 100 pounds, preferably from 50 to about 55 pounds, are formed. These blocks can be cylindrical, cubic or any other suitable shape. In the preferred manufacture, the liquid ingredients are transferred into paper bags or corrugated cardboard boxes which are closed, sealed and stored for a sufficient time to permit the liquid to solidify and reach a sufficient hardness for handling, typically for a time period of from 8 to about 10 hours. Thereafter, the resultant packages can be handled, shipped and stored. The solidified product exhibits an exotherm after solidification, its temperature rising about 5° to 20° F. within the first day after initial solidification. Rapid chilling of the product during this period can result in a soft solid. Accordingly, it is preferred to avoid exposure of the solid to surrounding air temperatures less than about 50° F. for the first 10 to 30 hours following manufacture. This can be accomplished by storage in an area having a temperature that is preferably maintained at 65°–100° F.

If desired, the solidifying components as previously described can be admixed with a suitable solid feed ingredient, e.g., any of the aforementioned proteinacious feed ingredients or fibrous material in chopped form. Suitable chopped fibrous materials include beet pulp, chopped straw, ensilage, cellulose, etc. These materials can be admixed with the solidifying components during preparation of the solidifying composition or with the composition, itself, to prepare products having about 25 weight percent or greater of the solidifying components and the balance being the aforementioned solid feed ingredient. Since the solid feed ingredients tend to reduce the pumpability of the resultant mixture, screw conveyors or extruders can be used to transfer the mixture before it solidifies.

The following table illustrates typical products which have been prepared by this invention.

Table 4

BLOCK FORMULA
Amount of Ingredients in Grams

| Block Ingredients | Function | Composition 1 | 2 | 3 | 4 | 5 |
|---|---|---|---|---|---|---|
| 89 Brix Cane Molasses | Sugar | | | | | |
| 79 Brix Cane Molasses | Sugar | 476 | 434 | 457 | 592 | 628 |
| 79 Brix Beet Molasses | Sugar | | | | | |
| 40% Condensed Whey | Sugar | | | | | |
| 55% Condensed Whey | Sugar | | | | | |
| Steffens Filtrate | Sugar | | | | | |
| Myces | Sugar | | | | | |
| Ammonium Lignin Sulfonate | Sugar | | | | | |
| Sodium Lignin Sulfonate | Sugar | | | | | |
| Magnesium Lignin Sulfonate | Sugar | | | | | |
| Fish Solubles (50%) | Protein | | | | | |
| Cell Cream (Dried) | Protein | | | | | |
| Urea | Protein | | 25 | | 55 | |
| Rabbit Pellets | Protein | | | 500 | | |
| Barley | Protein | | | | | 225 |
| Blood | Protein | 130 | | | 40 | |
| Cottonseed Meal | Protein | 120 | | | | |
| Soy Meal | Protein | 100 | | | 140 | |
| Dried Chicken Manure | Protein | | 500 | | | |
| Yellow Grease | Fat | 100 | | | 105 | |
| Palm Oil | Fat | | | | | |
| Mixed Vegetable Oils | Fat | | | | | |
| Lime[1] | Solidify | 17 | 13 | 15 | 30 | 30 |
| Magnesium Oxide | Solidify | | | | | |
| Mono Ammonium Phosphate | Phosphate | | | | | |
| Di-Ammonium Phosphate | Phosphate | | | | | |
| Phosphoric Acid | Phosphate | 80 | 28 | 30 | 60 | 60 |
| Di-Sodium Phosphate | Phosphate | | | | | |
| Water | Diluent | 70 | | | | |
| Sulfuric acid | pH Control | | | | | |
| Starch | Emulsifier | | | | | |
| Trace Minerals | — | | 2 | 1 | 2 | 2 |
| Preservatives | — | | | | | |
| Total Weight: | | 1095 | 1000 | 1002 | 969 | 1000 |
| 22 grams lactic acids | | | | | | |

BLOCK FORMULA
Amount of Ingredients in Grams

Composition

Table 4-continued

BLOCK FORMULA
Amount of Ingredients in Grams

| Block Ingredients | Function | 6 | 7 | 8 | 9 | 10 |
|---|---|---|---|---|---|---|
| 89 Brix Cane Molasses | Sugar | | | | | |
| 79 Brix Cane Molasses | Sugar | | 847 | 853 | 710 | 585 |
| 79 Brix Beet Molasses | Sugar | | | | | 150 |
| 40% Condensed Whey | Sugar | | | | | |
| 55% Condensed Whey | Sugar | 910 | | | | |
| Steffens Filtrate | Sugar | | | | | 50 |
| Myces | Sugar | | | | | |
| Ammonium Lignin Sulfonate | Sugar | | | | 50 | |
| Sodium Lignin Sulfonate | Sugar | | | | 50 | |
| Magnesium Lignin Sulfonate | Sugar | | | | 50 | |
| Fish Solubles (50%) | Protein | | | | | |
| Cell Cream (Dried) | Protein | | | | 50 | |
| Urea | Protein | | 65 | | 65 | |
| Rabbit Pellets | Protein | | | | | |
| Barley | Protein | | | | | |
| Blood | Protein | | | | | |
| Cottonseed Meal | Protein | | | | | |
| Soy Meal | Protein | | | | | |
| Dried Chicken Manure | Protein | | | | | |
| Fresh Egg (25% Solids) | Protein | | | | | |
| Yellow Grease | Fat | | | | | |
| Palm Oil | Fat | | | | | 50 |
| Mixed Vegetable Oils | Fat | | | | | 50 |
| Lime [1] | Solidify | 30 | 36 | 26 | 25[2] | 25 |
| Magnesium Oxide | Solidify | | | | | 10 |
| Mono Ammonium Phosphate | Phosphate | | 20 | | | 20 |
| Di-Ammonium Phosphate | Phosphate | | | | 20 | |
| Phosphoric Acid | Phosphate | 60 | 40 | 60 | 45 | 70 |
| Di-Sodium Phosphate | Phosphate | | | | | |
| Water | Diluent | | | | | |
| Sulfuric acid | pH Control | | | | | |
| Starch | Emulsifier | | | | | |
| Trace Minerals | — | | | 2 | 2 | 2 |
| Preservative | — | | 2[4] | | | |
| Total Weight: | | 1000 | 1000 | 1000 | 1000 | 1010 |

BLOCK FORMULA
Amount of Ingredients in Grams

| Block Ingredients | Function | Composition 11 | 12 | 13 | 14 | 15 |
|---|---|---|---|---|---|---|
| 89 Brix Cane Molasses | Sugar | 455 | 390 | | | |
| 79 Brix Cane Molasses | Sugar | | | 743 | 743 | 738 |
| 79 Brix Beet Molasses | Sugar | | | | | |
| 40% Condensed Whey | Sugar | 400 | | | | |
| 55% Condensed Whey | Sugar | | 300 | | | |
| Steffens Filtrate | Sugar | | | | | |
| Myces | Sugar | | | | | |
| Ammonium Lignin Sulfonate | Sugar | | | | | |
| Sodium Lignin Sulfonate | Sugar | | | | | |
| Magnesium Lignin Sulfonate | Sugar | | | | | |
| Fish Solubles (50%) | Protein | 40 | | | | |
| Cell Cream (Dried) | Protein | | | | | |
| Urea | Protein | | | 65 | 65 | 65 |
| Rabbit Pellets | Protein | | | | | |
| Barley | Protein | | | | | |
| Blood | Protein | | 100 | | | |
| Cottonseed Meal | Protein | | | | | |
| Soy Meal | Protein | | | | | |
| Dried Chicken Manure | Protein | | | | | |
| Fresh Egg (25% Solids) | Protein | | 100 | | | |
| Yellow Grease | Fat | | | 105 | 105 | 105 |
| Palm Oil | Fat | | | | | |
| Mixed Vegetable Oils | Fat | | | | | |
| Lime [1] | Solidify | 25 | 25 | 25 | 25 | 15 |
| Magnesium Oxide | Solidify | | | | | |
| Mono Ammonium Phosphate | 10 | | | 15 | 55 | |
| Di-Ammonium Phosphate | Phosphate | | | 15 | | |
| Phosphoric Acid | Phosphate | 50 | 60 | 45 | 45 | |
| Di-Sodium Phosphate | Phosphate | | | | | |
| Water | Diluent | | | | | |
| Sulfuric acid | pH Control | 10 | | | | |
| Starch | Emulsifier | 20 | | | | |
| Trace Minerals | — | 2 | | | | |
| Preservative | — | | 2[3] | | | |
| Total Weight: | | 1012 | 977 | 1000 | 1000 | 1000 |

BLOCK FORMULA
Amount of Ingredients in Grams

| Block Ingredients | Function | Composition 16 | 17 | 18 | 19 | 20 |
|---|---|---|---|---|---|---|

Table 4-continued

| Block Ingredients | Function | | | | | |
|---|---|---|---|---|---|---|
| 89 Brix Cane Molasses | Sugar | | | | | |
| 79 Brix Cane Molasses | Sugar | 647 | 747 | 447 | 447 | 647 |
| 79 Brix Beet Molasses | Sugar | | | | 320 | |
| 40% Condensed Whey | Sugar | | | | | |
| 55% Condensed Whey | Sugar | | | | | |
| Steffens Filtrate | Sugar | | | | 80 | 200 |
| Myces | Sugar | | | | | |
| Ammonium Lignin Sulfonate | Sugar | 200 | | | | |
| Sodium Lignin Sulfonate | Sugar | | | 400 | | |
| Magnesium Lignin Sulfonate | Sugar | | 100 | | | |
| Fish Solubles (50%) | Protein | | | | | |
| Cell Cream (Dried) | Protein | | | | | |
| Urea | Protein | 65 | 65 | 65 | 65 | 65 |
| Rabbit Pellets | Protein | | | | | |
| Barley | Protein | | | | | |
| Blood | Protein | | | | | |
| Cottonseed Meal | Protein | | | | | |
| Soy Meal | Protein | | | | | |
| Dried Chicken Manure | Protein | | | | | |
| Fresh Egg (25% Solids) | Protein | | | | | |
| Yellow Grease | Fat | | | | | |
| Palm Oil | Fat | | | | | |
| Mixed Vegetable Oils | Fat | | | | | |
| Lime [1] | Solidify | 26 | 26 | 26 | 26 | 26 |
| Magnesium Oxide | Solidify | | | | | |
| Mono Ammonium Phosphate | Phosphate | 60 | | | | |
| Di-Ammonium Phosphate | Phosphate | | | | | |
| Phosphoric Acid | Phosphate | | 60 | 60 | 60 | 60 |
| Di-Sodium Phosphate | Phosphate | | | | | |
| Water | Diluent | | | | | |
| Sulfuric acid | pH Control | | | | | |
| Starch | Emulsifier | | | | | |
| Trace Minerals | — | 2 | 2 | 2 | 2 | 2 |
| Preservative | — | | | | | |
| Total Weight: | | 1000 | 1000 | 1000 | 1000 | 1000 |

22 grams lactic acids

BLOCK FORMULA
Amount of Ingredients in Grams

| Block Ingredients | Function | Composition | | | | | | |
|---|---|---|---|---|---|---|---|---|
| | | 21 | 22 | 23 | 24 | 25 | 26 | 27 |
| 89 Brix Cane Molasses | Sugar | 805 | | | | | | |
| 79 Brix Cane Molasses | Sugar | | | | 720 | 720 | 930 | |
| 79 Brix Beet Molasses | Sugar | | | | | | | |
| 40% Condensed Whey | Sugar | | | | | | | |
| 55% Condensed Whey | Sugar | | 870 | | | | | |
| Steffens Filtrate | Sugar | | | | | | | |
| Myces | Sugar | | | | | | 847 | 911 |
| Ammonium Lignin Sulfonate | Sugar | | | | | | | |
| Sodium Lignin Sulfonate | Sugar | | | | | | | |
| Magnesium Lignin Sulfonate | Sugar | | | | | | | |
| Fish Solubles (50%) | Protein | | | | | | | |
| Cell Cream (Dried) | Protein | | | 50 | | | | |
| Urea | Protein | 20 | | | 50 | | 65 | |
| Rabbit Pellets | Protein | | | | | | | |
| Barley | Protein | | | | | | | |
| Blood | Protein | | | 50 | | | | |
| Cottonseed Meal | Protein | | | | | | | |
| Soy Meal | Protein | | | | | | | |
| Dried Chicken Manure | Protein | | | | | 1025 | | |
| Fresh Egg (25% Solids) | Protein | | | | | | | |
| Yellow Grease | Fat | | | 105 | 105 | | | |
| Palm Oil | Fat | | | | | | | |
| Mixed Vegetable Oils | Fat | | | | | | | |
| Lime [1] | Solidify | 25 | 25 | 22 | 22 | 28 | 26 | 27 |
| Magnesium Oxide | Solidify | | | | | | | |
| Mono Ammonium Phosphate | Phosphate | | | | | | | |
| Di-Ammonium Phosphate | Phosphate | | | | | | | |
| Phosphoric Acid | Phosphate | 50 | 45 | 52 | 52 | 66 | 60 | 112 |
| Di-Sodium Phosphate | Phosphate | 10 | | | | | | |
| Water | Diluent | 80 | | | | | | |
| Sulfuric acid | pH Control | | | | | | | |
| Starch | Emulsifier | 10 | | | | | | |
| Trace Minerals | — | | 2 | | | | 2 | |
| Preservative | — | | | 1[4] | 42[5] | | | |
| Total Weight: | | 1000 | 942 | 1000 | 1041 | 2049 | 1000 | 1050 |

[1] Lime added before phosphate
[2] Twenty grams of CaCl$_2$ also added
[3] Sodium Benzoate
[4] Sorbic acid
[5] 20 grams propanoic and 22 grams lactic acid The following examples will illustrate the practice of the invention and serve to demonstrate results obtainable thereby.

EXAMPLE I

The method of preparation was practiced by mixing 65 weight parts urea and 26 weight parts calcium oxide with 845 weight parts of a commercial 79 Brix cane molasses. The pH of the mixture was observed to rise from 5.95 to 10.4 after 8 minutes of mixing, at which time 60 weight parts of 75 weight percent orthophosphoric acid was added. The mixture was stirred for 15 additional minutes and its pH was 4.2 and its viscosity was 25,000 centipoise seconds. The mixture was poured into containers and packaged. After 2 hours the mixture began to solidify in the containers. After 24 hours the mixture was close to a final hardness and after 3 days the mixture reached a maximum hardness.

EXAMPLE II

A commercial production size batch of the feed supplement is prepared by introducing 4,782 pounds of 79 Brix cane molasses into a 6-ton capacity vessel with a turbine mixer. The pH and temperature of the molasses are 5.7° and 70° F., respectively. A total of 708 pounds urea is slowly added while stirring the molasses at 72 rpm, over a 5 minute period. The pH and temperature of the resultant mixture are 6.0° and 62° F., respectively.

Lime is then added, in an amount of 180 pounds, and the mixture is stirred for a period of 5 to 12 minutes. The temperature is monitored after the lime addition and when the mixture reaches 87° F., the pH is observed to be 10.0.

To the mixture is then added orthophosphoric acid in an amount of 330 pounds. The temperature of the mixture rises about 10° F. and the mixture is then packaged in boxes. The boxes are placed in a room maintained at about 70° F. for 24 hours. The feed supplement solidifies in the boxes within about 30 minutes after the acid addition and exhibits an exotherm of about 10° F. over a period of about 2–3 hours in the packages. The placement in the room at 70° F. insures maximum hardness of the product since exposure of the product to more reduced temperatures following its initial solidification cools the product excessively and results in a softer, less water resistant product.

The preceding examples are set forth herein solely to illustrate the practice of the invention and demonstrate results obtainable thereby. It is not intended that the invention be unduly limited by the specific illustration. Instead, it is intended that the invention be defined by ingredients and steps, and their obvious equivalents set forth in the following claims.

What is claimed is:

1. The method of preparing a solid animal feed supplement block product which comprises the steps of:
   (a) admixing at least about 0.5 weight percent based on the supplement product of a metal oxide selected from the class consisting of magnesium oxide, aluminum oxide, calcium oxide and mixtures thereof with an aqueous sugar solution containing from 10 to about 90 weight percent sugar;
   (b) hydrating said metal oxide to provide a sugar solution with soluble metal ions having a pH value from 9 to about 11;
   (c) thereafter reacting said solution with a monoalkali metal or ammonium orthophosphate or phosphoric acid at a concentration, expressed as $P_2O_5$, from 2 to about 5 weight percent based on the supplement product sufficient to react with said soluble metal ions and produce a product having a pH value from 3 to about 6, the amounts of said phosphate additive and metal ions being sufficient to solidify said supplement into a solid block; and
   (d) recovering a solid feed supplement block product.

2. The method of claim 1 including the step of adding from 5 to about 20 weight percent based on the supplement product of an animal-edible fat.

3. The method of claim 2 wherein said animaledible fat is yellow grease.

4. The method of claim 2 wherein said animaledible fat is palm oil.

5. The method of claim 1 wherein said metal oxide is calcium oxide.

6. The method of claim 5 wherein said metal oxide is added with a water soluble salt of said metal the proportions being such that the metal equivalent from the oxide should be at least 1.5 the equivalent of said salt coadditive.

7. The method of claim 1 including the step of adding a member selected from the group consisting of urea, biuret, ammonium phosphate, dried blood, cottonseed meal, soy meal, dehydrated alfalfa, dried and sterilized chicken manure, fish solubles, cell cream and rabbit pellets to said solution to provide from 5 to about 40 weight percent equivalent protein in said supplement.

8. The method of claim 4 wherein urea is added in an amount from 2 to about 15 weight percent of said supplement.

9. The method of claim 1 wherein phosphoric acid is added to the mixture of said sugar solution and metal oxide when the pH of said mixture reaches a value from 9 to about 11.

10. The method of claim 1 wherein phosphoric acid is added to the mixture of said sugar solution and metal oxide when the pH of said mixture reaches a value from 9.5 to about 10.5.

11. The method of claim 10 wherein the amount of phosphoric acid added to said mixture is sufficient to reduce the pH value of the resulting mixture to a value from 3.5 to about 5.

12. The method of claim 1 wherein said sugar solution is molasses.

13. The method of claim 1 wherein said sugar solution is condensed whey.

14. The method of claim 1 wherein said sugar solution is an ammonium or alkali metal lignin sulfonate solution.

15. The method of claim 1 wherein said sugar solution is a mixture of molasses and condensed whey.

16. The method of claim 1 wherein said sugar solution is a mixture of molasses and an ammonium or alkali metal lignin sulfonate.

17. The method of claim 13 wherein a preservative selected from the class of sorbic and benzoic acids and alkali metal salts thereof is incorporated in said feed supplement in an amount effective to prevent decomposition of said condensed whey.

18. The method of claim 15 wherein a preservative selected from the class of sorbic and benzoic acids and alkali metal salts thereof is incorporated in said feed supplement in an amount effective to prevent decomposition of said condensed whey.

* * * * *